US012583229B2

(12) United States Patent
Takei

(10) Patent No.: US 12,583,229 B2
(45) Date of Patent: Mar. 24, 2026

(54) LIQUID SUPPLY SYSTEM, CARTRIDGE, AND LIQUID EJECTION APPARATUS

(71) Applicant: CANON KABUSHIKI KAISHA, Tokyo (JP)

(72) Inventor: Yasunori Takei, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 18/524,824

(22) Filed: Nov. 30, 2023

(65) Prior Publication Data

US 2024/0181786 A1 Jun. 6, 2024

(30) Foreign Application Priority Data

Dec. 1, 2022 (JP) ................................ 2022-192721

(51) Int. Cl.
*B41J 2/175* (2006.01)

(52) U.S. Cl.
CPC ....... *B41J 2/17523* (2013.01); *B41J 2/17513* (2013.01); *B41J 2/17596* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/17553; B41J 2/17596; B41J 29/13
See application file for complete search history.

(56) References Cited

U.S. PATENT DOCUMENTS

| | | | | |
|---|---|---|---|---|
| 6,505,923 | B1 * | 1/2003 | Yamamoto | B41J 2/17553 347/85 |
| 9,669,631 | B2 * | 6/2017 | Takahashi | B41J 2/21 |
| 2011/0090270 | A1 * | 4/2011 | Harada | B41J 2/2107 347/9 |
| 2019/0030910 | A1 | 1/2019 | Tanabe et al. | B41J 2/17566 |
| 2021/0229448 | A1 * | 7/2021 | Miyamot | B41J 2/17566 |
| 2021/0300052 | A1 | 9/2021 | Takei et al. | |
| 2021/0300055 | A1 | 9/2021 | Koshikawa et al. | |
| 2023/0001701 | A1 | 1/2023 | Takei et al. | |

FOREIGN PATENT DOCUMENTS

| | | |
|---|---|---|
| JP | 2019-025818 | 2/2019 |

* cited by examiner

*Primary Examiner* — Anh T Vo
(74) *Attorney, Agent, or Firm* — Venable LLP

(57) ABSTRACT

A liquid supply system including a liquid reservoir tank communicating with a liquid ejection head to eject a liquid and a cartridge to reserve the liquid to be supplied to the reservoir tank and to be mounted on the tank. The tank includes a first air communication portion for air-communication of an inside and an outside of the tank, a first connection portion to connect the cartridge and the tank into liquid communication when the cartridge is mounted on the tank, and a second connection portion located above the first connection portion, liquid-tightly connected with the cartridge to connect the cartridge and the first air communication portion into air communication, when the cartridge is mounted on tank. The second connection portion is below a liquid surface of the liquid reserved in the cartridge when the cartridge in an initial state is mounted on tank.

19 Claims, 10 Drawing Sheets

LIQUID SUPPLY SYSTEM, CARTRIDGE, AND LIQUID EJECTION APPARATUS

CROSS-REFERENCE TO RELATED APPLICATIONS

This application claims the benefit of Japanese Patent Application No. 2022-192721, filed Dec. 1, 2022, which is hereby incorporated by reference herein in its entirety.

BACKGROUND

Field of the Disclosure

The present disclosure relates to a liquid supply system, a cartridge, and a liquid ejection apparatus.

Description of the Related Art

Liquid ejection apparatuses in which, by mounting a cartridge reserving a liquid on a tank communicating with a liquid ejection head that ejects the liquid to conduct printing, it is possible to supply the liquid from the cartridge to the liquid reservoir tank have conventionally been known.

Japanese Patent Laid-Open No. 2019-25818 discloses a liquid ejection apparatus including a liquid reservoir tank including an air communication portion and a cartridge including an air communication port.

However, in the configuration disclosed in Japanese Patent Laid-Open No. 2019-25818, at the time of using the liquid ejection apparatus, since both of the liquid reservoir tank and the cartridge individually communicate with the air, the ink flows until the heights of the liquid surfaces inside them become even. For this reason, it is difficult to maintain the height of the liquid surface at a constant level inside the liquid reservoir tank.

As a result, until the liquid reserved in the cartridge is used up, the height of the liquid surface greatly fluctuates inside the liquid reservoir tank. Since a large fluctuation of the height of the liquid surface in the liquid reservoir tank also causes the pressure applied to the liquid ejection head communicating with the liquid reservoir tank to largely fluctuate, it can become difficult to conduct a stable printing operation.

In view of this, an object of the present disclosure is to provide a liquid supply system that maintains a height of a liquid surface in a liquid reservoir tank at a substantially constant level.

SUMMARY

A liquid supply system comprising a liquid reservoir tank communicating with a liquid ejection head to eject a liquid and a cartridge configured to reserve the liquid to be supplied to the liquid reservoir tank and to be capable of being mounted on the liquid reservoir tank, wherein the liquid reservoir tank includes a first air communication portion to bring an inside and an outside of the liquid reservoir tank into air communication, a first connection portion configured to be capable of bringing the cartridge and the liquid reservoir tank into liquid communication in a state where the cartridge is mounted on the liquid reservoir tank, and a second connection portion configured to be located above the first connection portion, liquid-tightly connected with the cartridge, and capable of bringing the cartridge and the first air communication portion into air communication, in the state where the cartridge is mounted on the liquid reservoir tank, and in a situation where the cartridge in an unused state is mounted on the liquid reservoir tank, the second connection portion is located below a liquid surface of the liquid reserved in the cartridge.

Further features of the present invention will become apparent from the following description of exemplary embodiments with reference to the attached drawings.

DESCRIPTION OF THE EMBODIMENTS

First Embodiment

<Liquid Ejection Apparatus>

Figure 1A:
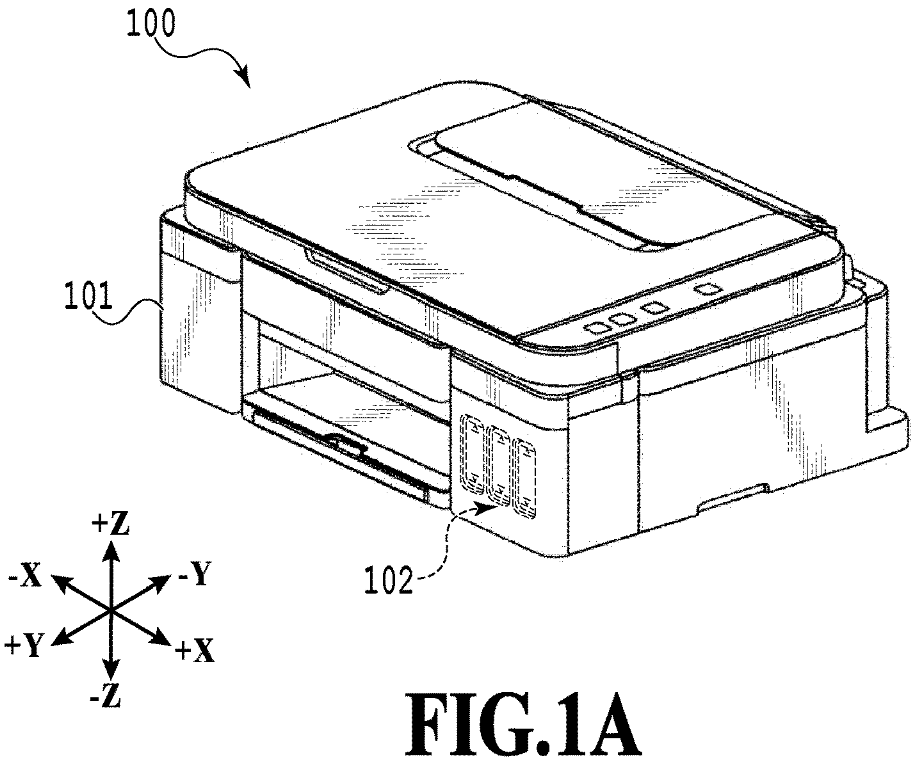
FIGS. 1A and 1B are diagrams showing an example of a liquid ejection apparatus in one embodiment.
Figure 1B:
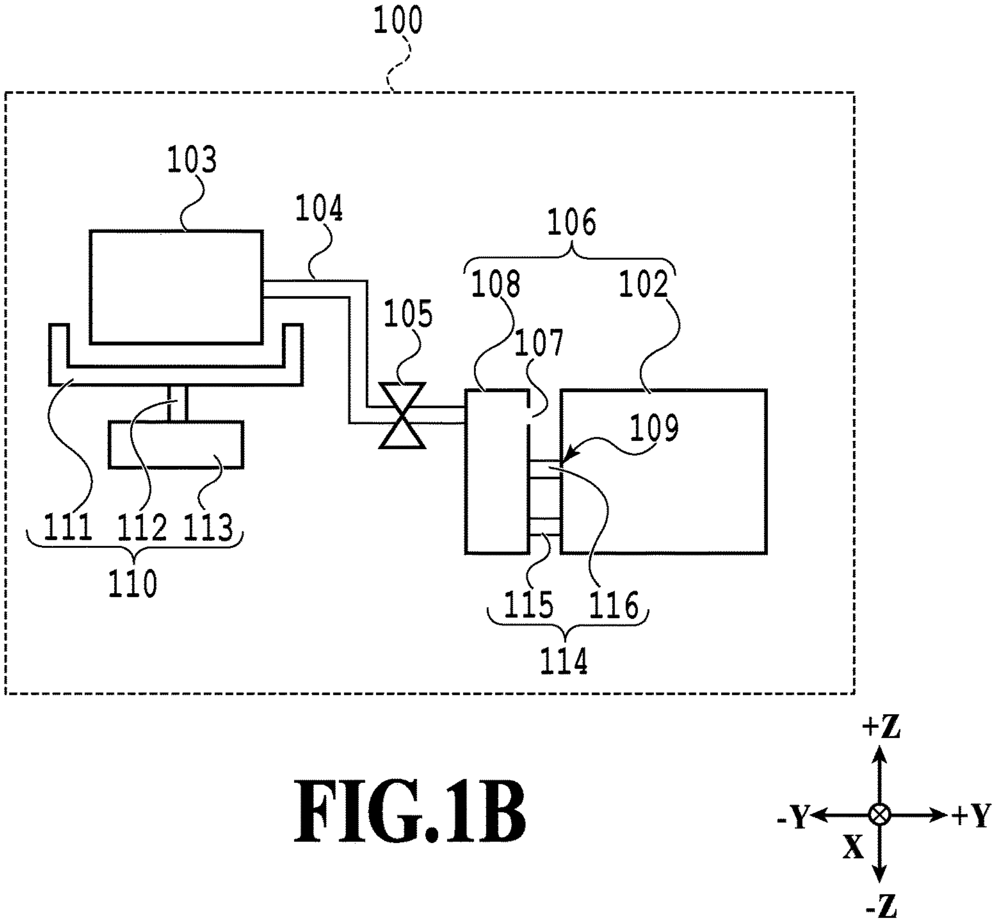

FIGS. 1A and 1B are diagrams showing an example of a liquid ejection apparatus 100 in the present embodiment.

FIG. 1A is an external perspective view of the liquid ejection apparatus 100.

In the drawings referred to in the present specification, an X direction and a Y direction indicate two directions orthogonal to each other on a horizontal plane. A Z direction indicates a vertical direction. In addition, a +Y direction indicates frontward, a −Y direction indicates rearward, a −X direction indicates leftward, a +X direction indicates rightward, a +Z direction indicates upward or above, and a −Z direction indicates downward or below, each of the liquid ejection apparatus 100. In addition, in the following description, upward or above, downward or below, and leftward and rightward indicate directions in the attitude of the liquid ejection apparatus 100 as used in a normal state unless otherwise noted.

As shown in FIG. 1A, the liquid ejection apparatus 100 includes a housing 101 that forms its outer shell. The liquid ejection apparatus 100 is an apparatus having a function of printing an image. For example, the liquid ejection apparatus 100 is a serial-type ink-jet printer. Inside the housing 101, first cartridges 102, each of which reserves a liquid (for example, ink) inside and is non-reloadable are housed. Note that, although the present embodiment is described on the assumption that the number of the first cartridges 102 is four, the number of the first cartridges 102 only has to be one or more and is not limited to four.

FIG. 1B is a schematic diagram showing a supply route of the liquid.

As shown in FIG. 1B, the liquid ejection apparatus 100 includes a liquid ejection head 103 that ejects the liquid to print an image, and a liquid supply system 106 that is connected to the liquid ejection head 103 through a tube 104. The liquid supply system 106 includes a first sub tank 108 configured to communicate with the liquid ejection head 103, and a first cartridge 102 that reserves the liquid to be supplied to the first sub tank 108 and is configured to be detachably attachable to the first sub tank 108. The tube 104 is connected at one end to the liquid ejection head 103 and at the other end to the first sub tank 108. A tube valve 105 controls opening and closing of the tube 104.

In the present embodiment, the first sub tank 108 functions as a liquid reservoir tank that temporarily reserves the liquid supplied from the first cartridge 102. In the first sub tank 108, a first air communication portion 107 that brings the inside and the outside of the tank into air communication is formed. On the other hand, in the first cartridge 102, a second air communication portion 109, which brings the inside and the outside of the first cartridge 102 into air communication, is formed.

The liquid ejection apparatus 100 includes a suction recovery mechanism 110 that recovers the ejection performance of ejection ports included in the liquid ejection head 103. The suction recovery mechanism 110 includes a cap 111 that covers an ejection port face of the liquid ejection head 103, a suction pump 113, and a suction tube 112 that is connected at one end to the cap 111 and at the other end to the suction pump 113.

In the present embodiment, the first sub tank 108 includes a mounting portion 114 for mounting thereon the first cartridge 102 that has reserved the liquid. The mounting portion 114 includes a first connection portion 115 that is connected to a liquid supply portion included in the first cartridge 102, and a second connection portion 116 that is connected to the second air communication portion 109 included in the first cartridge 102.

The first connection portion 115 is configured to bring the first cartridge 102 and the first sub tank 108 into liquid communication in a state where the first cartridge 102 is mounted on the first sub tank 108. The second connection portion 116 is liquid-tightly connected with the first cartridge 102 in the state where the first cartridge 102 is mounted on this liquid reservoir tank. Then, the second connection portion 116 is configured to be capable of bringing the first cartridge 102 and the first air communication portion 107 included in the first sub tank 108 into air communication. The second connection portion 116 is located between a wall portion of the first cartridge 102 and a wall portion of the first sub tank 108 in the state where the first cartridge 102 is mounted on the first sub tank 108.

Furthermore, although not shown in FIG. 1B, the liquid ejection apparatus 100 includes a scanning mechanism that causes the liquid ejection head 103 to scan in the main scanning direction, a conveyance mechanism that conveys a printing medium on which printing is made by the liquid ejection head 103, a control unit that controls the configurations included inside the housing 101, and the like. An example of the printing medium includes a printing sheet, and the like.

Once the first cartridge 102 is mounted on the first sub tank 108, the liquid reserved inside the first cartridge 102 is supplied to the first sub tank 108. The first sub tank 108 temporarily reserves the liquid supplied from the first cartridge 102. Thereafter, a suction recovery operation is conducted by the suction recovery mechanism 110. In the suction recovery operation, all the ejection ports included in the liquid ejection head 103 are covered with the cap 111, and, in this state, the suction pump 113 is driven. Then, the inside of the cap 111 is brought into a negative pressure, so that the liquid is suctioned and discharged from the liquid ejection head 103 through the suction tube 112. In this way, the ejection performance of the ejection ports included in the liquid ejection head 103 is recovered.

Along with the suction recovery, the tube 104 is opened by the tube valve 105, so that the liquid is supplied from the first sub tank 108 to the liquid ejection head 103. In this way, a liquid supply route from the first cartridge 102 to the liquid ejection head 103 is formed, so that the liquid ejection head 103 is brought into the state of being capable of ejecting the liquid.

<First Sub Tank 108>

Figure 2A:
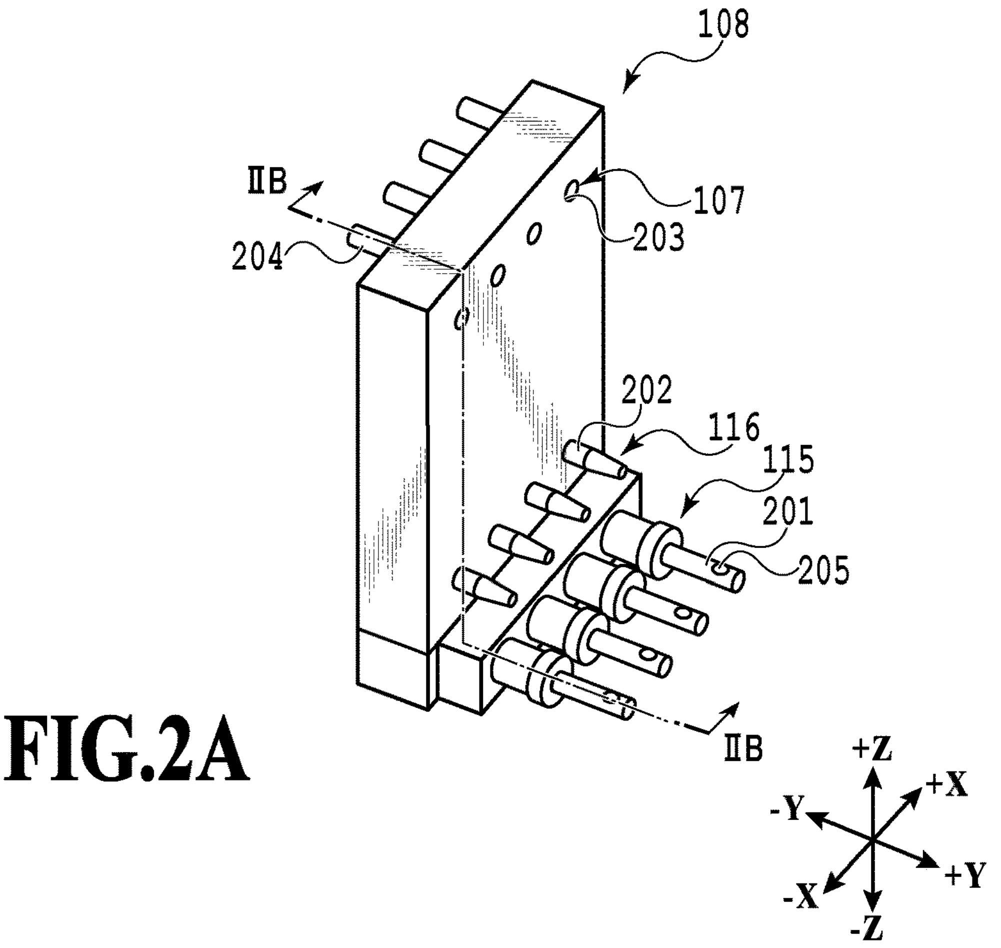
FIGS. 2A and 2B are diagrams describing a configuration of a sub tank in one embodiment.
Figure 2B:
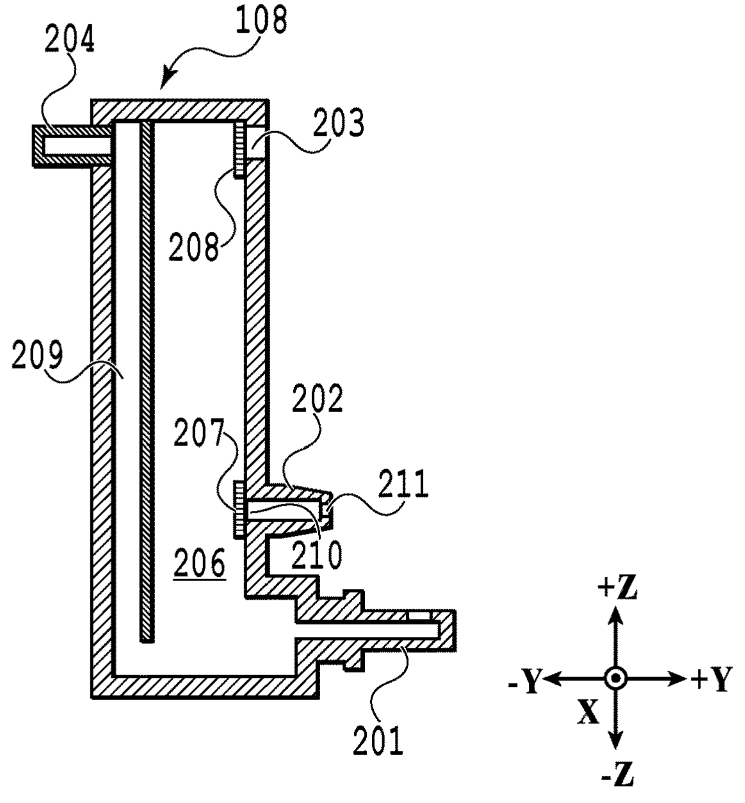

FIGS. 2A and 2B are diagrams describing a configuration of the first sub tank 108 in the present embodiment.

FIG. 2A is an external perspective view showing an example of the first sub tank 108 in the present embodiment.

As shown in FIG. 2A, on a rear wall portion of the first sub tank 108, inlet pipes 201 as the first connection portion 115, hollow needles 202 as the second connection portion 116, and air communication ports 203 as the first air communication portion 107 are formed. On a front wall portion of the first sub tank 108, flow outlets 204 that can be connected to the tube 104 (see FIG. 1B) and lets the liquid flow out are formed.

The inlet pipes 201 protrude rearward from a lower portion of the rear wall portion of the first sub tank 108. In front end portions (end portions on the +Y direction side in the drawing) of the inlet pipes 201, inlets 205 for introducing the liquid from the outside to the inside of the inlet pipe 201 are formed. In the present example, the inlets 205 are open upward in the front end portions of the inlet pipes 201. The hollow needles 202 protrude rearward from the rear wall portion of the first sub tank 108 at positions above the position where the inlet pipes 201 are formed.

FIG. 2B is a schematic sectional view taken along IIb-IIb line shown in FIG. 2A.

As shown in FIG. 2B, the first sub tank 108 includes a tank reservoir chamber 206 that temporarily reserves the liquid supplied from the first cartridge 102 (see FIG. 1B). In the tank reservoir chamber 206, a first semipermeable membrane 207 and a second semipermeable membrane 208 each formed from an air-liquid separation member that does not transmit the liquid but transmits gas are disposed. Furthermore, in the first sub tank 108, a tank flow passage 209 that passes the liquid from the tank reservoir chamber 206 to the flow outlet 204 is formed.

In the hollow needle 202, a first opening 210 that is located on the base end-side and communicates with the tank reservoir chamber 206, and a second opening 211 that is located on the front end-side and brings the inside and the outside of the hollow needle 202 into air communication are formed. The first opening 210 is in air communication with the second opening 211. That is, it can be said that a gas flow passage through which the first opening 210 is in air communication with the second opening 211 is formed in the hollow needle 202. The first opening 210 is covered with the first semipermeable membrane 207. The air communication port 203 is covered with the second semipermeable membrane 208. By disposing the first semipermeable membrane 207 and the second semipermeable membrane 208, the flow out of the liquid from the tank reservoir chamber 206 through the hollow needle 202 or the air communication port 203 or both of these is suppressed.

At the time of printing operation and at the time of suction recovery operation, the liquid is supplied from the tank reservoir chamber 206 to the liquid ejection head 103 (see FIG. 1B) through the tank flow passage 209 and the flow outlet 204. Note that, inside the first sub tank 108, a plurality of tank reservoir chambers 206 for reserving liquids of different types (for example, inks having different colors) are defined and arranged in the X direction. The inlet pipe 201, the hollow needle 202, the air communication port 203, and the flow outlet 204 are formed in correspondence with each of the plurality of tank reservoir chambers 206.

<First Cartridge 102>

Figure 3A:
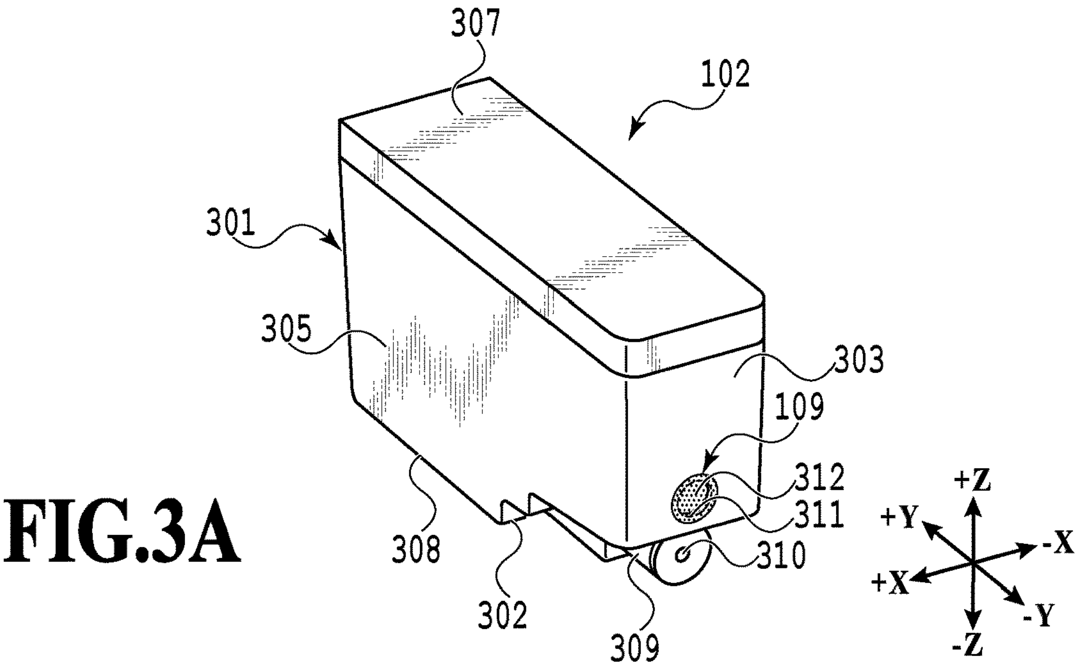
FIGS. 3A to 3C are diagrams showing an example of a cartridge in one embodiment.
Figure 3B:
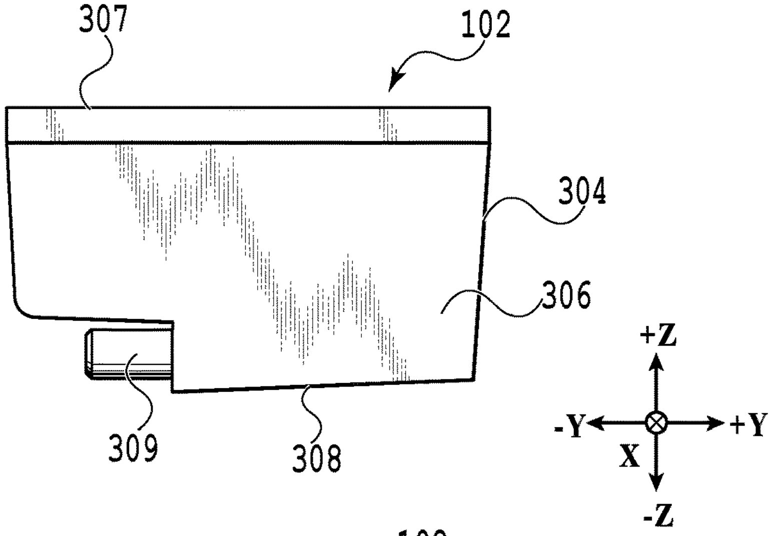
Figure 3C:
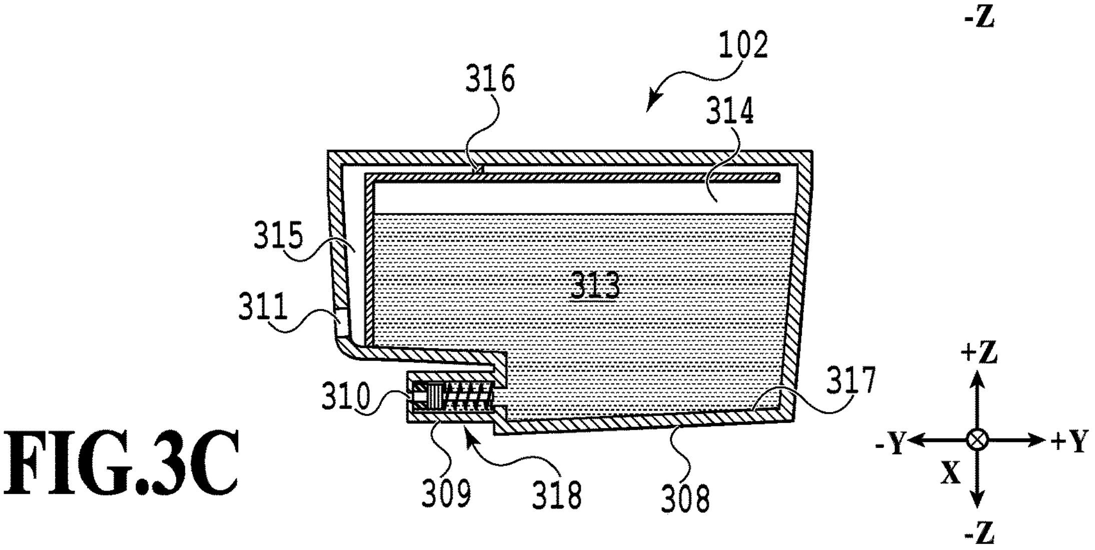

FIGS. 3A to 3C are diagrams showing an example of the first cartridge 102 in the present embodiment. FIG. 3A is a schematic external perspective view of the first cartridge 102 in the present embodiment. FIG. 3B is a schematic side view of the first cartridge 102 in the present embodiment.

As shown in FIG. 3A and FIG. 3B, the first cartridge 102 includes a cartridge housing 301 in the form of hollow box having a substantially rectangular parallelepiped shape. The cartridge housing 301 includes a first front wall portion 302 and a second front wall portion 303. In the state where the cartridge housing 301 is mounted on the first sub tank, the first front wall portion 302 faces in a direction to the position of the first sub tank (that is, the −Y direction) and the second front wall portion 303 is located at a position above the first front wall portion 302 and on the −Y direction side. The cartridge housing 301 includes a rear wall portion 304. In the state where the cartridge housing 301 is mounted on the first sub tank, the rear wall portion 304 faces in the opposite direction to that of the first front wall portion 302 and the second front wall portion 303 (that is, the +Y direction). The cartridge housing 301 includes a right wall portion 305, a left wall portion 306, an upper wall portion 307, and a bottom wall portion 308. In the state where the cartridge housing 301 is mounted on the first sub tank, the right wall portion 305 faces in the +X direction, the left wall portion 306 faces in the −X direction, the upper wall portion 307 faces in the +Z direction, and the bottom wall portion 308 faces in a substantially −Z direction.

On the first front wall portion 302, a cylindrical liquid supply portion 309 that supplies the liquid in the case where the first cartridge 102 is mounted on the first sub tank 108 (see FIG. 1B) is disposed. In a front end portion of the liquid supply portion 309 (an end portion on the −Y direction side in the drawing), a first insertion slot 310 into which the inlet pipe 201 (see FIG. 2A and FIG. 2B) is inserted in the case of mounting the first cartridge 102 on the first sub tank 108 (see FIG. 1B) is formed. That is, the liquid supply portion 309 is configured to be capable of being brought into liquid communication with the first connection portion 115 (see FIG. 1B).

In the second front wall portion 303, the second air communication portion 109, which brings the inside of the first cartridge 102 and the inside of the first sub tank 108 into air communication in the state where the first cartridge 102 is mounted on the first sub tank 108 (see FIG. 1B), is formed. The second air communication portion 109 is configured to be liquid-tightly connected to the second connection portion 116 (see FIG. 1B) and thus capable of being brought into air communication with the first air communication portion 107 (see FIG. 1B).

The second air communication portion 109 includes a second insertion slot 311 into which the hollow needle 202 (see FIG. 2A and FIG. 2B) is inserted in the case of mounting the first cartridge 102 on the first sub tank 108 (see FIG. 1B). The second insertion slot 311 is a through-hole penetrating the second front wall portion 303. The second insertion slot 311 is formed below the liquid surface of the liquid reserved inside the first cartridge 102 in an initial state (unused state). In the first cartridge 102 in the initial state, a sealing member 312 (for example, a film) that seals the second insertion slot 311 from outside the first cartridge 102 is attached to the second front wall portion 303.

FIG. 3C is a schematic sectional view of the first cartridge 102 in the present embodiment. FIG. 3C shows a reserving state of the liquid in the case when the initial first cartridge 102 takes a normal usage attitude.

As shown in FIG. 3C, the first cartridge 102 includes a cartridge reservoir chamber 313 that has reserved the liquid inside. In the first cartridge 102 in the initial state, the height of the liquid surface in the cartridge reservoir chamber 313 is located above the second insertion slot 311. In the cartridge reservoir chamber 313, there is a space 314 in which the air exists, above the region in which the liquid is reserved. In this state, the second insertion slot 311 is located below the liquid surface of the liquid reserved in the cartridge reservoir chamber 313.

Inside the first cartridge 102, a cartridge flow passage 315, which brings the second insertion slot 311 into air communication with the space 314 in the cartridge reservoir chamber 313, is formed. In a middle of the cartridge flow passage 315, a third semipermeable membrane 316 formed from an air-liquid separation member that does not transmit the liquid, but transmits gas, is disposed.

In a part of the bottom wall portion 308, an inclined surface 317, which is inclined in such a manner as to lower from the rear end toward the front end in the attitude of the first cartridge 102 at the time of usage, is formed. This makes it possible to smoothly guide the liquid from the cartridge reservoir chamber 313 toward the liquid supply portion 309 along the inclined surface 317 inside the first cartridge 102. Inside the liquid supply portion 309, a first valve mechanism 318, that opens and closes the first insertion slot 310, is disposed.

<Connection Between First Connection Portion 115 and Liquid Supply Portion 309>

Figure 4A:
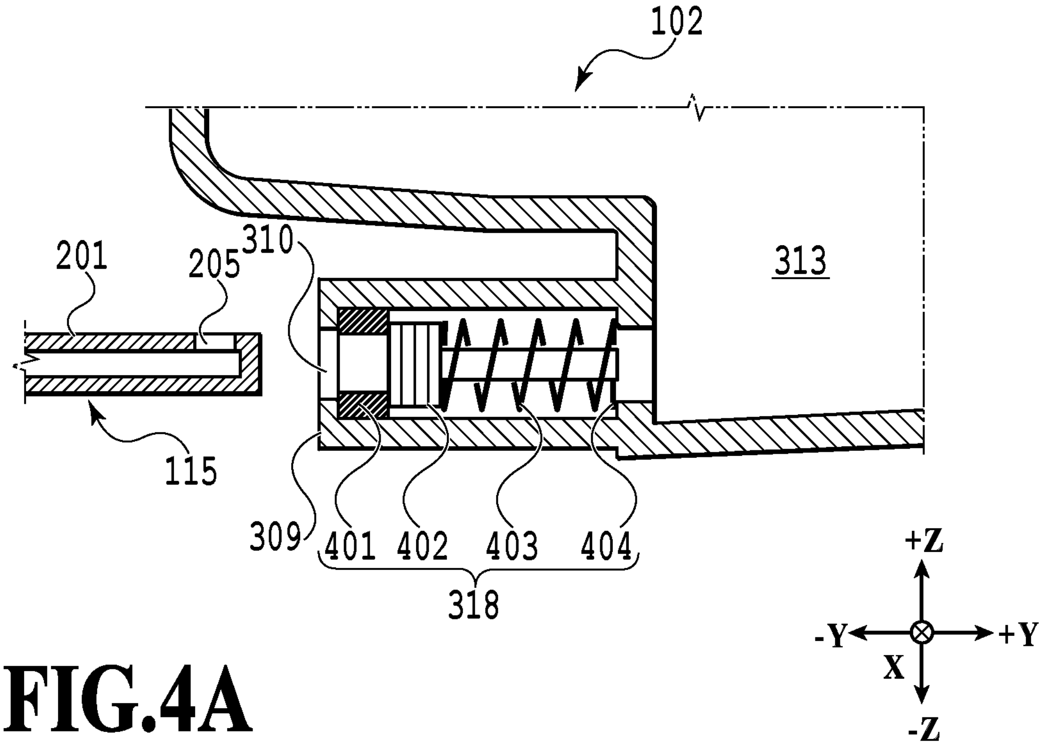
FIGS. 4A and 4B are diagrams describing connection between a first connection portion and a liquid supply portion in one embodiment.
Figure 4B:
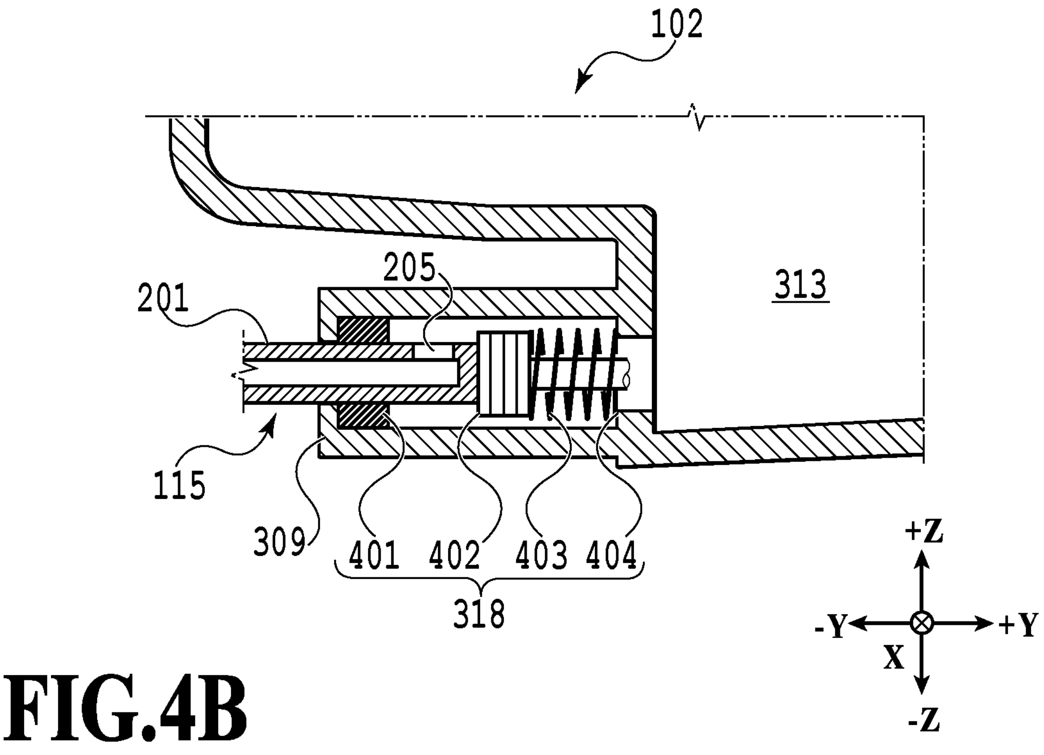

FIGS. 4A and 4B are diagrams describing connection between the first connection portion 115 and the liquid supply portion 309 in the present embodiment.

FIG. 4A is a diagram showing the state where the first connection portion 115 is not connected to the liquid supply portion 309.

As shown in FIG. 4A, the first valve mechanism 318 includes an annular sealing member 401, a first valve 402 that is disposed to be capable of advancing and retreating relative to the first insertion slot 310, a first urging member 403 that urges the first valve 402, and a first supporting portion 404 that supports the first urging member 403. An example of the sealing member 401 includes an O-ring that is disposed in such a manner as to seal the periphery of the first insertion slot 310. In the state of being urged by the first urging member 403 (for example, a coil spring), the first valve 402 comes into tight contact with the sealing member 401 to seal the sealing member 401. Hence, in this state, the liquid in the liquid supply portion 309 does not flow out from the first insertion slot 310.

FIG. 4B is a diagram showing the state where the first connection portion 115 has been connected to the liquid supply portion 309. In the case of mounting the first cartridge 102 on the first sub tank 108 (not shown here), the first cartridge 102 is moved toward the −Y direction in the drawing. Then, the inlet pipe 201 included in the first sub tank 108 is relatively inserted into the first insertion slot 310 included in the first cartridge 102. That is, the inlet pipe 201 enters the inside of the liquid supply portion 309 including the first insertion slot 310.

As shown in FIG. 4B, once the inlet pipe 201 enters the inside of the liquid supply portion 309, the inlet pipe 201 presses the first valve 402 and moves the first valve 402 rearward (in the +Y direction in the drawing) against the urging force of the first urging member 403. As a result, the first valve 402 is separated from the sealing member 401.

In this way, inside the liquid supply portion 309, the first valve 402 is brought into an open state to bring the inside of the liquid supply portion 309 and the inside of the inlet pipe 201 into liquid communication through the inlet 205. Such a configuration allows the liquid that has flowed from the cartridge reservoir chamber 313 into the liquid supply portion 309 to be introduced from the inlet 205 into the inside of the inlet pipe 201. Then, the liquid flows through the inside of the inlet pipe 201 and flows into the tank reservoir chamber 206 (see FIG. 1B).

As described above, the first cartridge 102 in the initial state is maintained in the state where the inside is sealed by the first valve 402. Hence, at the time of transportation, and the like, no matter what attitude the first cartridge 102, is brought in, the liquid inside does not flow out to the outside. Note that the first cartridge 102, shown in FIGS. 4A and 4B, is provided for each type of liquid used in the printing operation. Each cartridge has the same configuration except that the types of liquids reserved therein (for example, colors) are different.

<Air Communication Mechanism>

FIGS. 5A to 5D are sectional views schematically describing the communication process of the air and the movement of the liquid in the case when the first cartridge 102 is mounted on the first sub tank 108 in the present embodiment. Note that the illustration of the first valve mechanism, and the like, that are irrelevant to the communication of the air is omitted here.

Figure 5A:
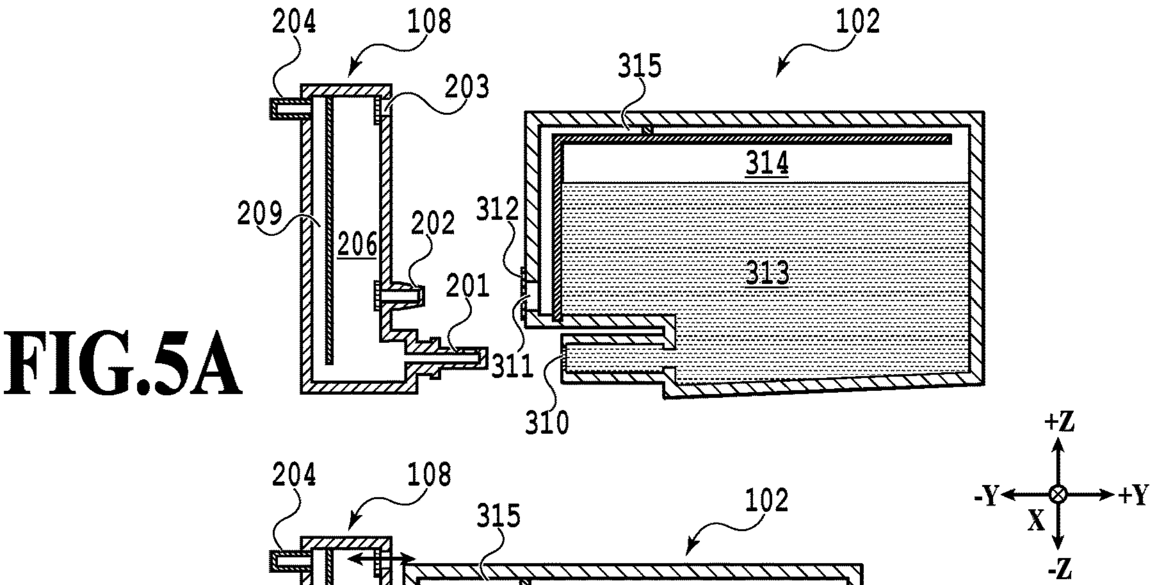
FIGS. 5A to 5D are schematic sectional views of a sub tank and a cartridge on one embodiment.

FIG. 5A is a diagram showing the state before the first cartridge 102 is mounted on the first sub tank 108.

As shown in FIG. 5A, in the state where the first cartridge 102 has not been mounted on the first sub tank 108 and before the first sub tank 108 is filled with the liquid, the hollow needle 202 is located below the liquid surface of the liquid reserved in the first cartridge 102. In addition, in this state, the tank reservoir chamber 206 is in communication with the air through the air communication port 203.

On the other hand, the liquid is reserved in the cartridge reservoir chamber 313 of the first cartridge 102. In addition, as mentioned above, the second insertion slot 311 is also sealed by the sealing member 312. Hence, the inside of the first cartridge 102 is not in communication with the air.

Figure 5B:
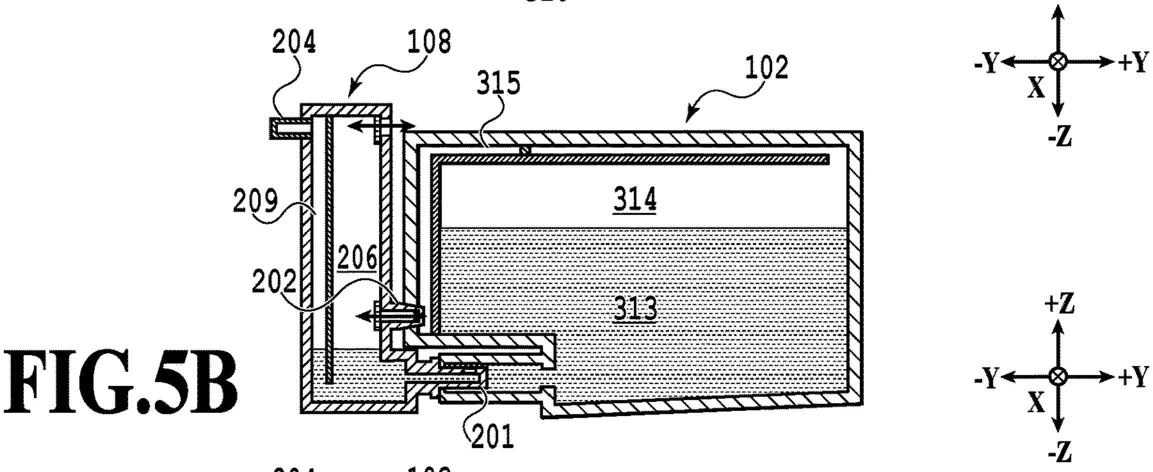

FIG. 5B is a diagram showing the state where the first cartridge 102 has been mounted on the first sub tank 108.

As shown in FIG. 5B, in the case of mounting the first cartridge 102 on the first sub tank 108, the inlet pipe 201 is first inserted into the first insertion slot 310 (see FIG. 5A). Subsequently, the hollow needle 202 is inserted into the second insertion slot 311 (see FIG. 5A) formed in the first cartridge 102. In this event, the sealing member 312 (see FIG. 5A) is penetrated by the hollow needle 202. That is, the sealing member 312 (see FIG. 5A) is broken through by the hollow needle 202. In the state where the mounting has been completed, the hollow needle 202 is maintained in the fluid-tight state with the second insertion slot.

The shape of the hollow needle 202 is a tapered shape that maintains the size of the outer diameter from the base end portion (the end portion on the −Y direction side in the drawing) to a middle toward the front end portion (the end portion on the +Y direction side in the drawing), but gradually decreases in diameter from the middle to the front end. As shown in the drawing, the outer diameter of the front end in the hollow needle 202 is smaller than the inner diameter of the second insertion slot of the first cartridge 102, and the outer diameter of a middle portion of the hollow needle 202 is equal to or greater than the inner diameter of the second insertion slot. According to such a configuration, once the hollow needle 202 is inserted into the second insertion slot in a predetermined amount, the middle portion of the hollow needle 202 comes into tight contact with the inner surface of the second insertion slot, and the fluid-tight state is maintained between the outer peripheral surface of the hollow needle 202 and the inner peripheral surface of the second insertion slot.

Then, the tank reservoir chamber 206 and the space 314 are brought into communication through the hollow needle 202 and the cartridge flow passage 315. In this way, the insides of the first cartridge 102 and the first sub tank 108 are brought into communication with the air through the space 314, the cartridge flow passage 315, the hollow needle 202, the tank reservoir chamber 206, and the air communication port 203. Note that arrows in the drawing indicate a schematic route of communication of the air. After the inside of the first cartridge 102 is brought into communication of the air, the liquid flows from the cartridge reservoir chamber 313 to the tank reservoir chamber 206 due to the water head difference.

Figure 5C:
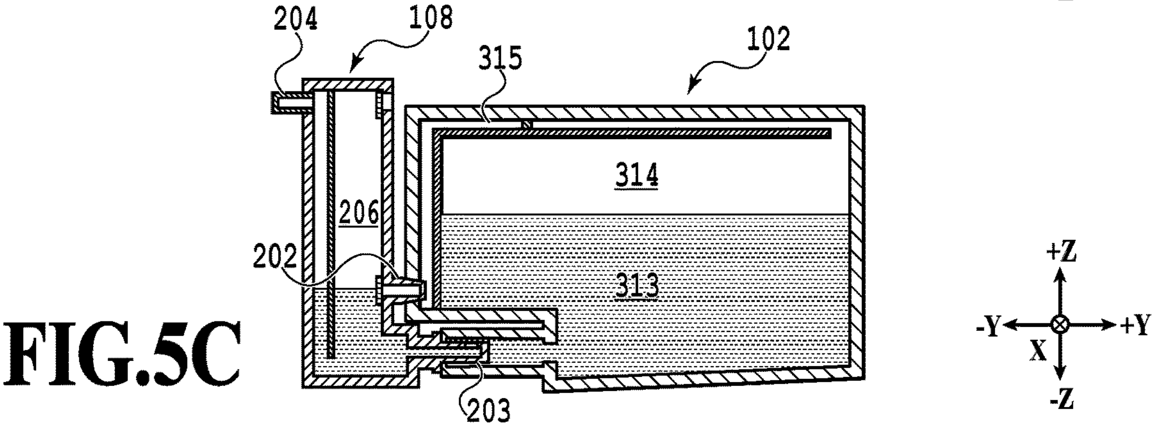

FIG. 5C is a diagram showing the state where the filling with the liquid has been completed.

As shown in FIG. 5C, as the flow of the liquid from the cartridge reservoir chamber 313 to the tank reservoir chamber 206 proceeds, the liquid surface rises in the tank reservoir chamber 206. When the liquid surface rises and the height of the liquid surface thus reaches the height at which the hollow needle 202 is formed, the hollow portion of the hollow needle 202, which has been in air communication with the inside of the first cartridge 102, is blocked by the liquid held in the tank reservoir chamber 206. This stops the flow of the liquid from the first cartridge 102 into the first sub tank 108, and the filling with the liquid is completed.

Figure 5D:
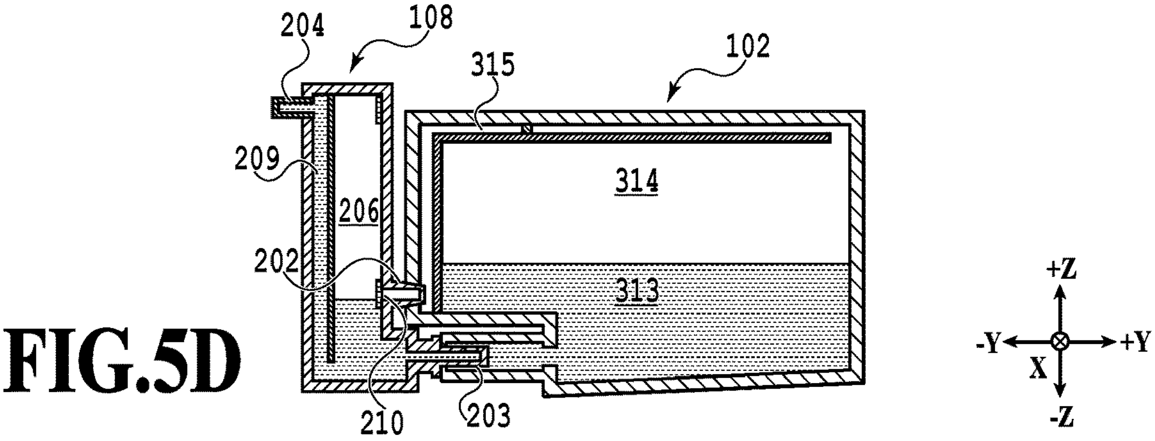

FIG. 5D is a diagram showing the state where the suction recovery operation of the liquid ejection head 103 has been conducted from the state shown in FIG. 5C.

As shown in FIG. 5D, by the suction recovery mechanism 110 (see FIG. 1B) conducting the suction recovery operation of the liquid ejection head, the liquid is supplied from the tank reservoir chamber 206 to the liquid ejection head through the tank flow passage 209 and the flow outlet 204. In this way, the preparation of the printing operation is completed. Thereafter, as the liquid ejection head 103 (see FIG. 1B) conducts the printing operation, the liquid surface in the tank reservoir chamber 206 lowers. Once the height of the liquid surface becomes lower than the height at which the hollow needle 202 is formed, the first cartridge 102 is brought into communication with the air through the hollow needle 202. Then, the liquid again flows from the first cartridge 102 to the first sub tank 108. Then, the liquid surface rises in the tank reservoir chamber 206, and the hollow needle 202 is blocked again, so that the flow-in of the liquid stops. In the present embodiment, in this way, the filling with the liquid and the stop thereof are repeated.

Hence, while the liquid surface in the first cartridge 102 is at a position higher than the hollow needle 202, even if the height of the liquid surface fluctuates inside the first sub tank

108, the range of fluctuation can be held within a range of the size of the first opening 210.

Therefore, the liquid supply system of the present disclosure makes it possible to maintain the height of the liquid surface in the liquid reservoir tank at a substantially constant level.

Furthermore, since the height of the liquid surface is maintained at a substantially constant level inside the liquid reservoir tank, pressure applied to the liquid ejection head 103 becomes substantially constant. For this reason, it becomes possible to conduct a stable printing operation.

In addition, inside the first sub tank 108, the amount of the liquid is controlled to the minimum amount necessary for a stable printing operation in the liquid ejection head 103. This also makes it possible to suppress the thickening of the liquid and the like which are caused by evaporation of the liquid inside the first sub tank 108.

In addition, in contrast to the conventional configuration including air communication portions in both sub tank and cartridge, the first cartridge 102 does not include a protrusion having a gas flow passage formed therein on an upper surface of the upper wall portion 307 unlike the conventional cartridge. In the technique of the present disclosure, the configurations for communication of the air are consolidated in the first sub tank 108. This also makes it possible to reduce the number of components of the first cartridge 102 and to reduce in size of the first cartridge 102.

Second Embodiment

Hereafter, a second embodiment in the technique of the present disclosure will be described. In the following description, configurations identical or corresponding to those of the first embodiment will be denoted by the same signs and names, and their descriptions will be omitted as appropriate, and different points will be mainly described. The present embodiment aims at suppressing evaporation of the liquid inside the cartridge.

<Sub Tank>

Figure 6A:
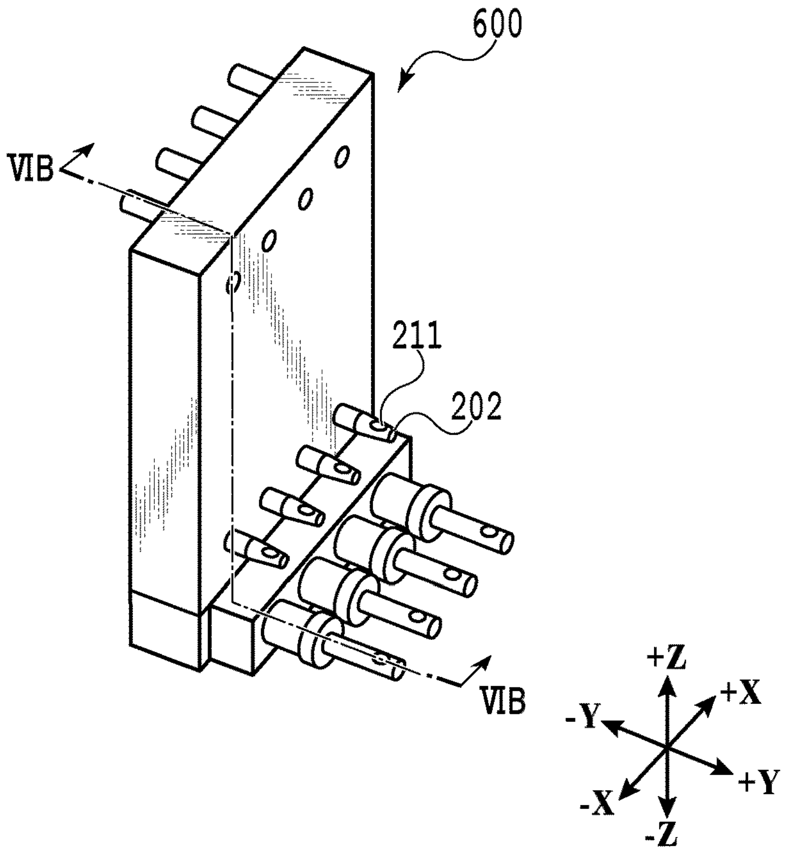
FIGS. 6A and 6B are diagrams showing an example of a sub tank in one embodiment.
Figure 6B:
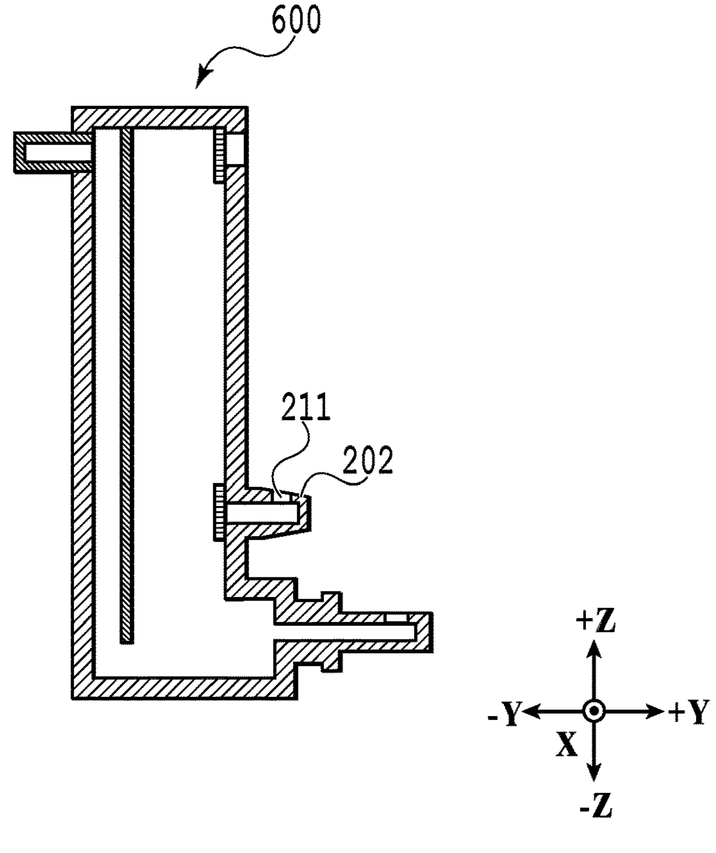

FIGS. 6A and 6B are diagrams showing an example of a second sub tank 600 in the present embodiment.

FIG. 6A is an external perspective view of the second sub tank 600 in the present embodiment.

As shown in FIG. 6A, in the present embodiment, the positions at which the second openings 211 are formed are different from those in the first embodiment. The second openings 211 in the present embodiment are formed in parts of peripheral wall portions of the hollow needles 202. In the present example, the second openings 211 are open upward in the front end portions of the hollow needles 202.

FIG. 6B is a sectional view taken along VIb-VIb line shown in FIG. 6A. As shown in FIG. 6B, the front end of the hollow needle 202 is not open.

<Second Cartridge 700>

Figure 7:
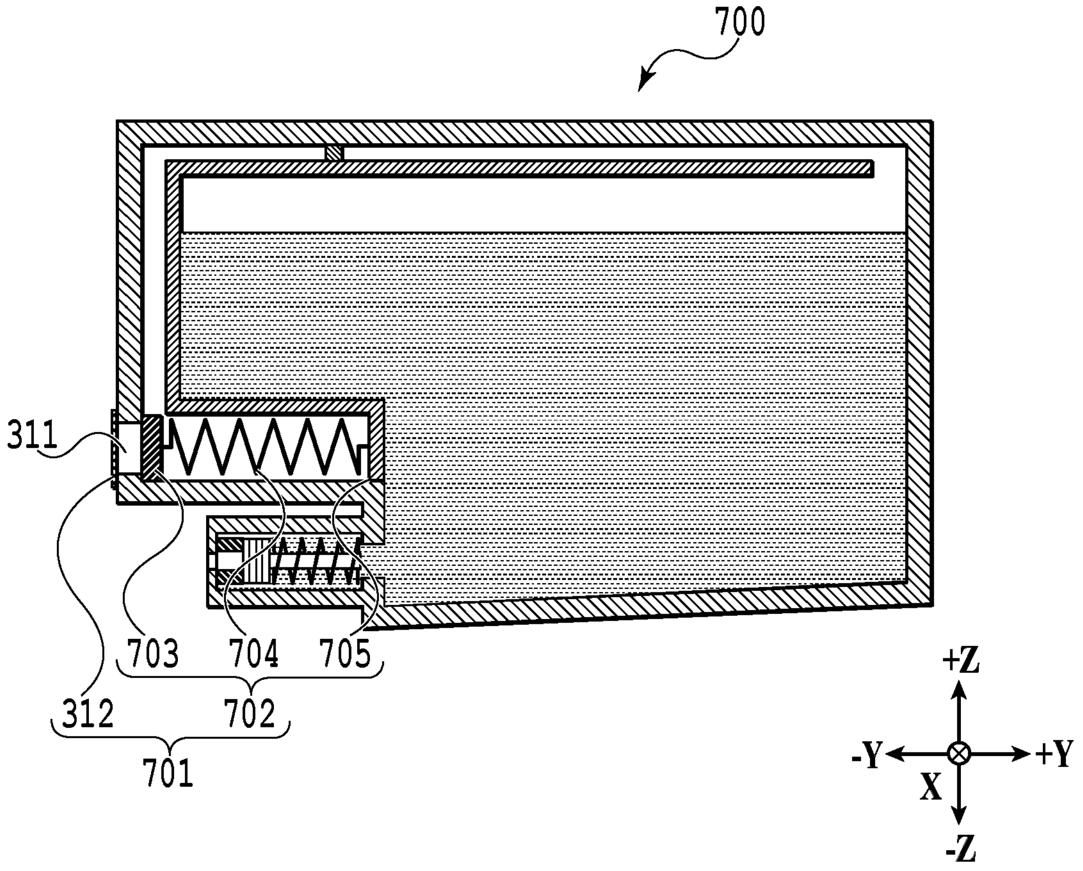
FIG. 7 is a schematic sectional view of a cartridge in one embodiment.

FIG. 7 is a schematic sectional view of a second cartridge 700 in the present embodiment. Note that the external shape of the second cartridge 700 is the same as in the example shown in FIG. 3A and FIG. 3B.

As shown in FIG. 7, the second cartridge 700 includes a sealing mechanism 701 that seals the second insertion slot 311. The sealing mechanism 701 includes the sealing member 312 and a second valve mechanism 702. In the second cartridge 700, in the initial state, the sealing member 312 seals the second insertion slot 311 from outside the second cartridge 700 and the second valve mechanism 702 seals the second insertion slot 311 from inside the second cartridge 700.

The second valve mechanism 702 includes a second valve 703 that is disposed to be capable of advancing and retreating relative to the second insertion slot 311, a second urging member 704 that urges the second valve 703 toward the second insertion slot 311, and a second supporting portion 705 that supports the second urging member 704. An example of the second urging member 704 includes a coil spring. In the state where the second cartridge 700 is not mounted on the second sub tank 600 (see FIG. 6A and FIG. 6B), the second valve 703 is brought in the state of sealing the second insertion slot 311 by the second urging member 704. That is, in the state where the second cartridge 700 is not mounted on the second sub tank 600, the second insertion slot 311 is in the state of being sealed by the second valve 703.

Furthermore, outside the second cartridge 700, the sealing member 312 seals the second insertion slot 311. Hence, in this state, the air in the second cartridge 700 does not flow out from the second insertion slot 311.

<Second Air Communication Mechanism>

FIGS. 8A to 8D are sectional views schematically describing the communication process of the air and the movement of the liquid in the case where the second cartridge 700 is mounted on the second sub tank 600 in the present embodiment.

Figure 8A:
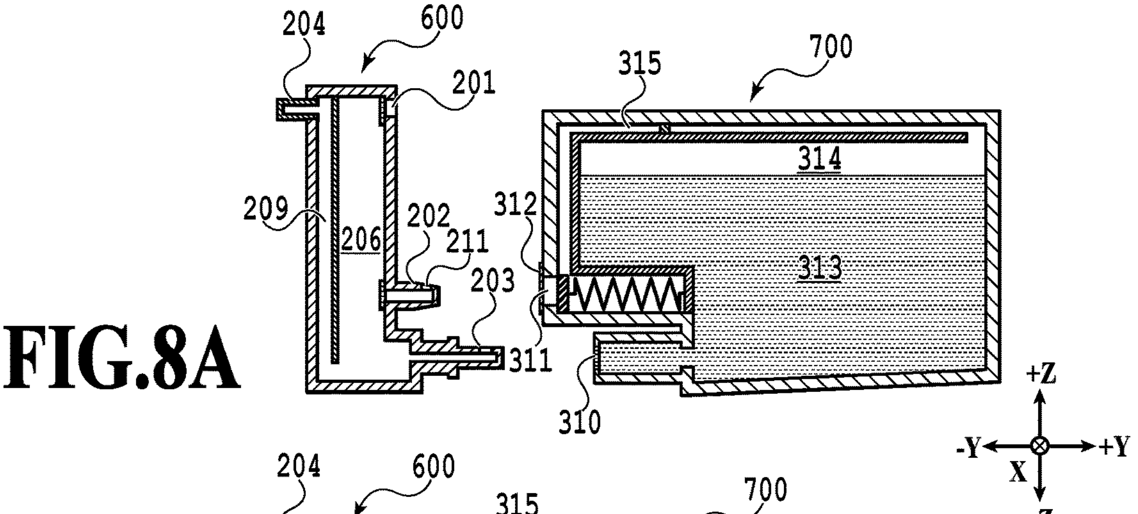
FIGS. 8A to 8D are schematic sectional views of a sub tank and a cartridge in one embodiment.

FIG. 8A is a diagram showing the state before the second cartridge 700 is mounted on the second sub tank 600.

As shown in FIG. 8A, the second liquid supply system in the present embodiment includes the second cartridge 700 and the second sub tank 600. At this time, the second cartridge 700 has not been mounted on the second sub tank 600 yet.

Figure 8B:
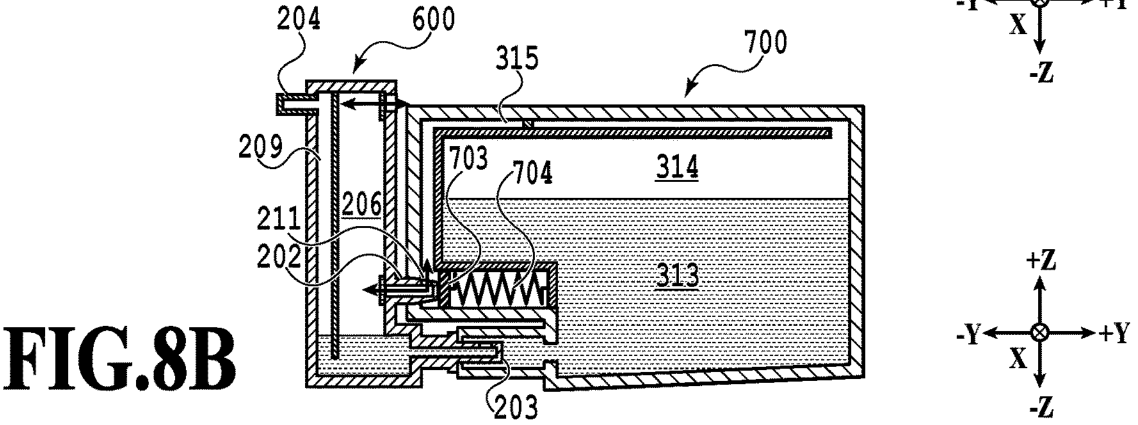

FIG. 8B is a diagram showing the state where the second cartridge 700 has been mounted on the second sub tank 600.

As shown in FIG. 8B, in the present embodiment, as entering the second insertion slot 311, the hollow needle 202 presses and penetrates the sealing member 312. Then, as further entering the inside of the second insertion slot 311, the hollow needle 202 moves the second valve 703 against the urging force of the second urging member 704 in a direction in which the second valve 703 separates from the second insertion slot 311.

In the present embodiment, since the second opening 211 is not formed in the front end of the hollow needle 202 which presses the second valve 703, the communication of the air is not hindered. That is, in the present embodiment, since the second opening 211 is formed in the peripheral wall portion of the hollow needle 202, which does not come into contact with the second valve 703, the communication of the air is ensured. By the second valve 703 separating from the second insertion slot 311, the inside of the hollow needle 202 and the inside of the second cartridge 700 are brought into air communication through the second opening 211.

Note that arrows in the diagram indicates a schematic route of communication of the air. After the inside of the second cartridge 700 is brought into communication with the air, the liquid flows from the cartridge reservoir chamber 313 to the tank reservoir chamber 206 due to the water head difference.

Figure 8C:
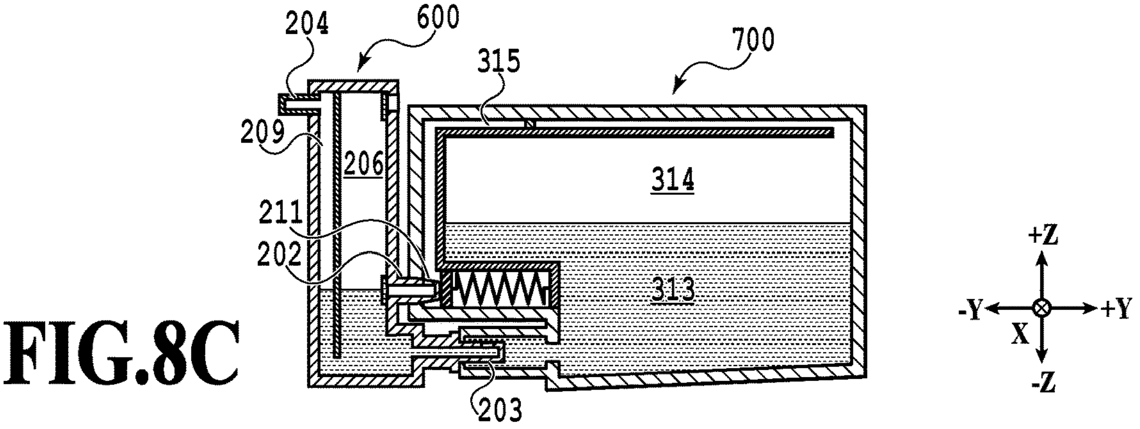

FIG. 8C is a diagram showing the state where the filling with the liquid has been completed.

As shown in FIG. 8C, as the flow of the liquid from the cartridge reservoir chamber 313 to the tank reservoir chamber 206 proceeds, the liquid surface rises in the tank reservoir chamber 206. When the liquid surface rises and the height of the liquid surface reaches the height at which the hollow needle 202 is formed, the hollow portion of the hollow needle 202 through which the inside of the second cartridge 700 has been in communication with the air is blocked by the liquid held in the tank reservoir chamber 206. This stops the flow of the liquid from the second cartridge 700 into the second sub tank 600, and the filling with the liquid is completed.

Figure 8D:
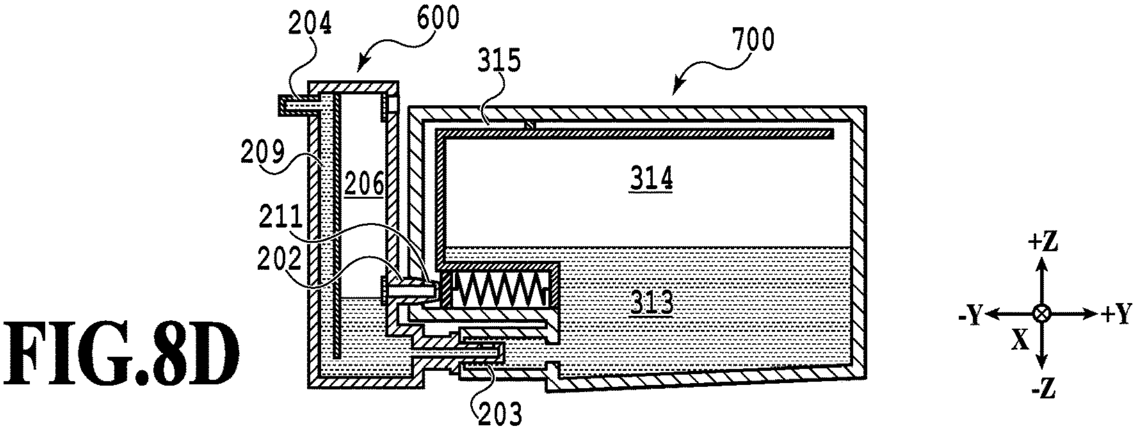

FIG. 8D is a diagram showing the state where the suction recovery operation of the liquid ejection head has been conducted.

As shown in FIG. 8D, by the above-mentioned suction recovery operation being conducted, the liquid is supplied from the tank reservoir chamber 206 to the liquid ejection head through the tank flow passage 209 and the flow outlet 204. In this way, the preparation of the printing operation is completed.

According to such a configuration, even in the case where the second cartridge 700 has been removed from the second sub tank 600 before the liquid inside the second cartridge 700 is used up, the second valve 703 is caused to return to the original position by the urging force of the second urging member 704. That is, the second cartridge 700 is sealed again.

Therefore, according to the second liquid supply system in the present embodiment, evaporation of the liquid in the second cartridge 700 can be suppressed. Furthermore, in the second cartridge 700, since evaporation of the liquid is suppressed, an increase in viscosity due to evaporation of the liquid can also be suppressed.

Third Embodiment

Hereafter, a third embodiment in the technique of the present disclosure will be described. In the following description, configurations identical or corresponding to those of the first embodiment or the second embodiment will be denoted by the same signs and names, and their descriptions will be omitted as appropriate, and different points will be mainly described. The present embodiment aims at further reducing the size of the sub tank compared with the above-described embodiments.

Figure 9A:
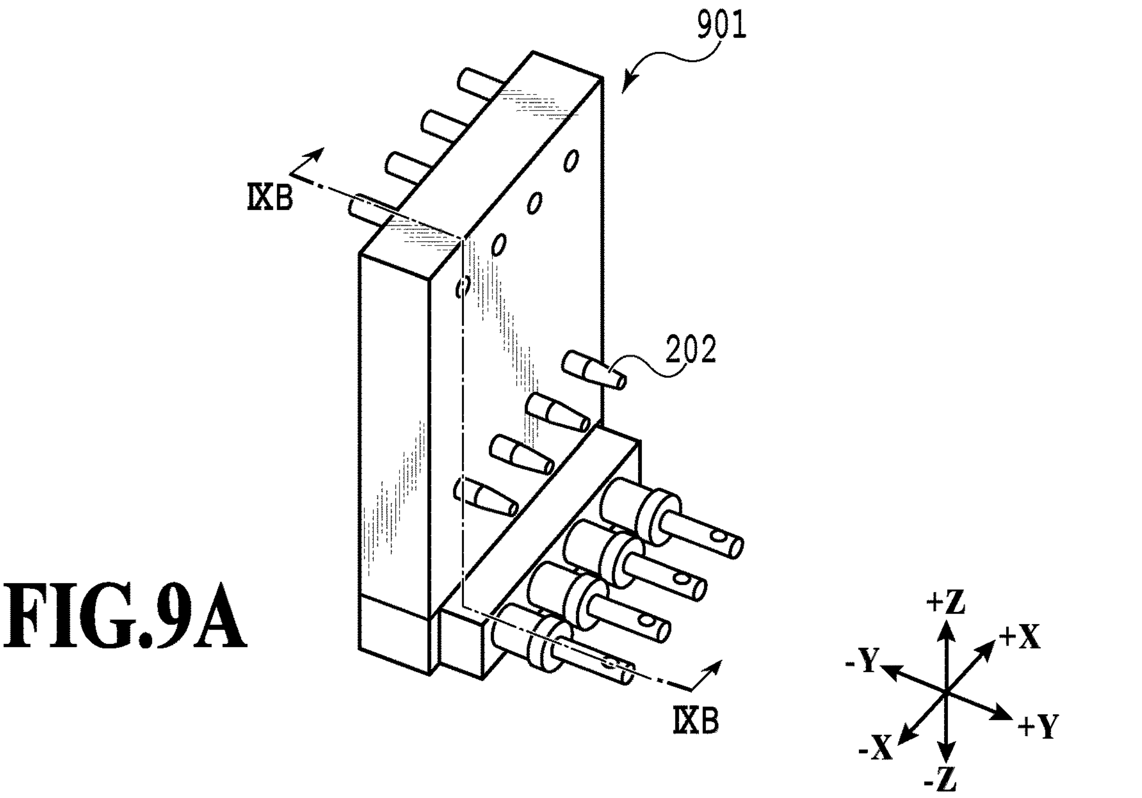
FIGS. 9A to 9C are diagrams showing an example of a liquid supply system in one embodiment.
Figure 9B:
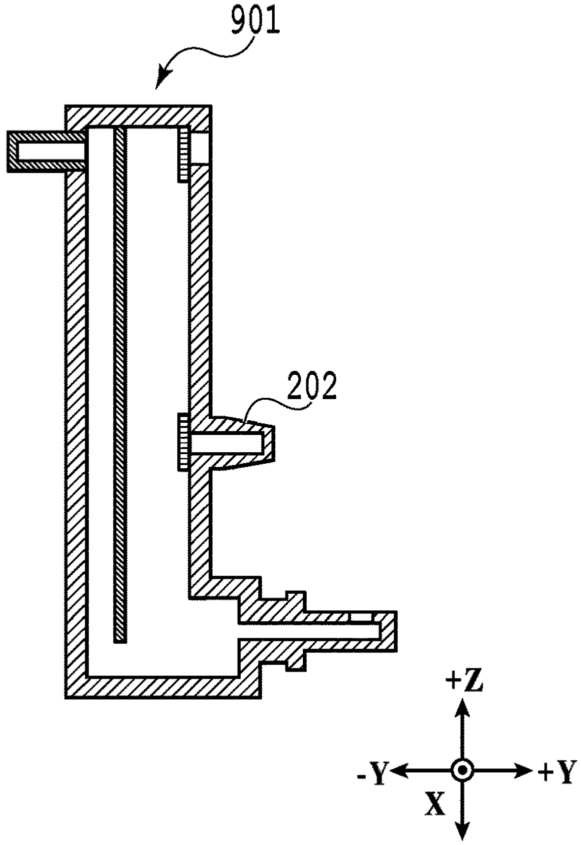
Figure 9C:
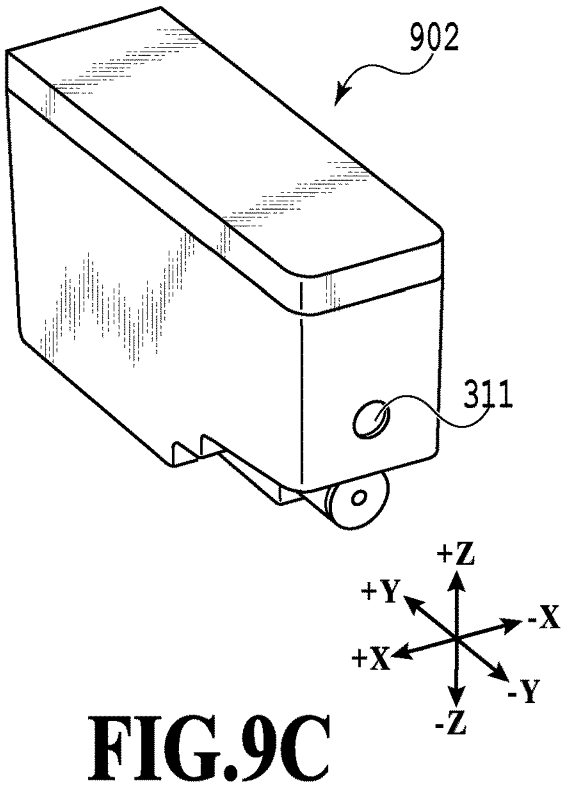
Figure 10A:
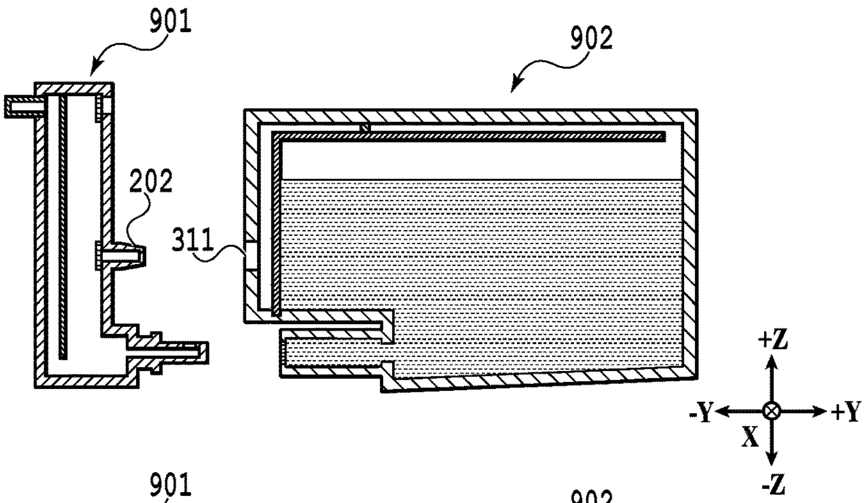
FIGS. 10A to 10D are schematic sectional views of a sub tank and a cartridge in one embodiment.
Figure 10B:
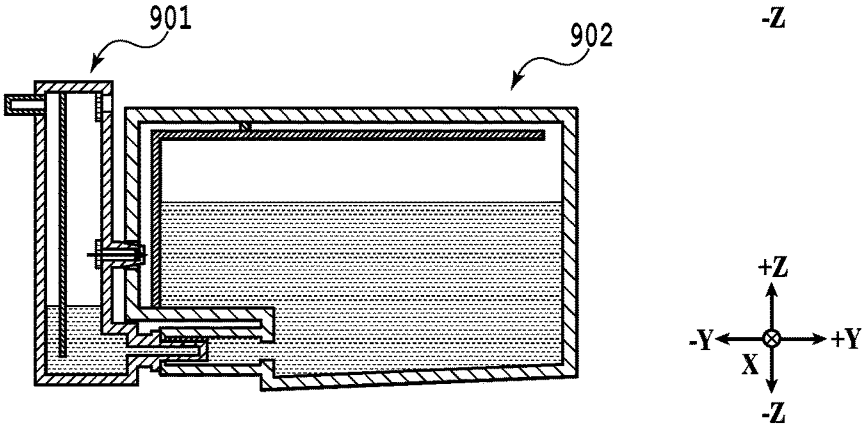
Figure 10C:
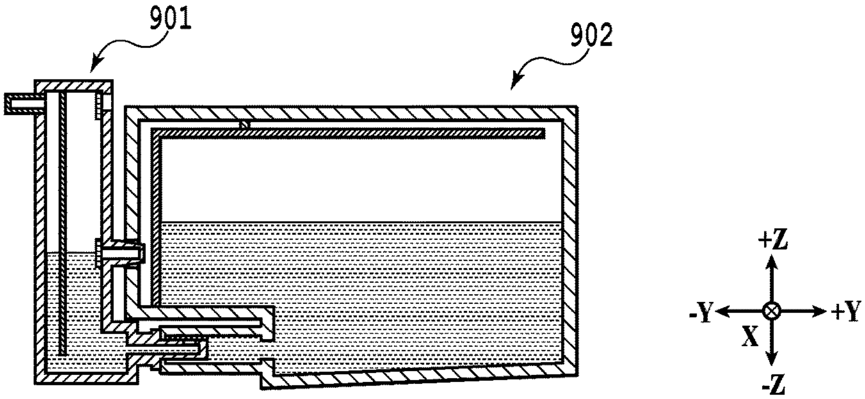
Figure 10D:
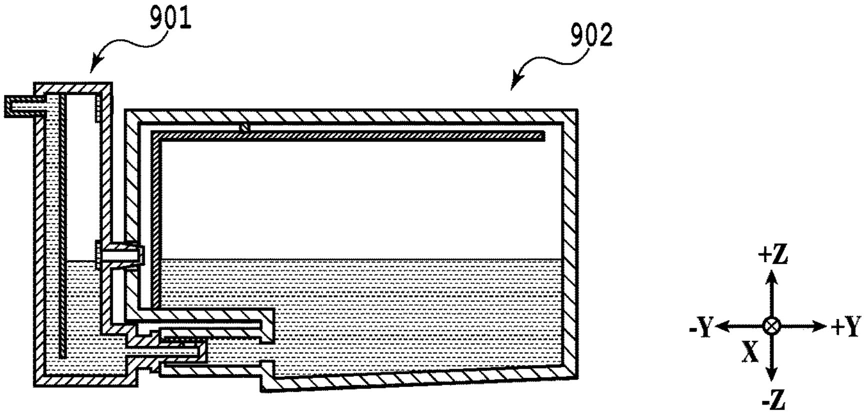

FIGS. 9A to 9C are diagrams showing an example of a third sub tank 901 and a third cartridge 902 in the present embodiment.

As shown in FIGS. 9A to 9C, a third liquid supply system in the present embodiment includes the third sub tank 901 and the third cartridge 902.

FIG. 9A is an external perspective view of the third sub tank 901 in the present embodiment. The hollow needle 202 in the present embodiment is formed at a position higher (on the +Z direction side) than those in the first embodiment and the second embodiment.

FIG. 9B is a sectional view taken along IXb-IXb line shown in FIG. 9A.

As shown in FIG. 9B, the third sub tank 901 in the present embodiment has a length in the depth direction (the Y direction in the drawing) less than those in the first embodiment and the second embodiment. In addition, in the present embodiment, the hollow needle 202 is formed at a height that allows the length of the third sub tank 901 in the depth direction to be reduced and also the necessary amount of the liquid to be maintained in the third sub tank 901. This makes it possible to achieve a reduction in space inside the liquid ejection apparatus 100 (not shown here) while maintaining the performance required for the third sub tank 901.

FIG. 9C is an external perspective view of the third cartridge 902 in the present embodiment.

As shown in FIG. 9C, the second insertion slot 311, in the present embodiment is formed at a position higher (on the +Z direction side) than that in the first cartridge 102 (see FIG. 3A) in conformity with the height of the hollow needle 202 of the third sub tank 901. The other configurations are the same as in the first cartridge 102, and their detailed descriptions will be omitted.

<Third Air Communication Mechanism>

FIGS. 10A to 10D are sectional views schematically describing the communication process of the air and the movement of the liquid in the case when the third cartridge 902 is mounted on the third sub tank 901 in the present embodiment.

As shown in FIG. 10A to FIG. 10D, in the present embodiment, the hollow needle 202, formed above that in the first embodiment in order to reserve the necessary amount of the liquid inside the third sub tank 901, is made thinner than that in the first embodiment. On the other hand, the second insertion slot 311 is also formed at a position conforming to the height of the hollow needle 202. Such a configuration makes it possible to achieve both a reduction in space inside the liquid ejection apparatus and maintenance of the performance the third sub tank 901 originally has. Note that the other operations for the filling with the liquid are the same as those in the first embodiment and the second embodiment.

Therefore, according to the liquid supply system in the present embodiment, it is possible to further reduce the size of the third sub tank 901 without hindering the performance the third sub tank 901 originally has.

Other Embodiment

The configurations of the above-mentioned sub tanks, cartridges, or both of these are not limited to those mentioned above. For example, the positions, the numbers, or the shapes of the mounting portion, the air communication portion, and the flow outlet can be changed as appropriate, as long as the functions in the technique of the present disclosure can be satisfied. A rubber-made joint, or the like, may also be disposed in the air communication portion.

A sealing member (for example, a film), which seals the first insertion slot 310 may be attached to the first front wall portion 302 in the first cartridge 102 in the initial state.

The liquid supply system of the present disclosure makes it possible to maintain the height of the liquid surface in the liquid reservoir tank at a substantially constant level.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A liquid supply system comprising:
- a liquid reservoir tank communicating with a liquid ejection head to eject a liquid; and
- a cartridge configured to reserve the liquid to be supplied to the liquid reservoir tank and to be capable of being mounted on the liquid reservoir tank, wherein the liquid reservoir tank includes:
- a first air communication portion for air-communication of an inside and an outside of the liquid reservoir tank;
- a first connection portion configured to connect the cartridge and the liquid reservoir tank into liquid communication in a state where the cartridge is mounted on the liquid reservoir tank, and a second connection portion configured to be located above the first connection portion, liquid-tightly connected with the cartridge to connect the cartridge and the first air communication portion into air communication, in the state where the cartridge is mounted on the liquid reservoir tank, wherein the second connection portion is located below a liquid surface of the liquid reserved in the cartridge at a time when the cartridge in an initial state is mounted on the liquid reservoir tank, the second connection portion includes a hollow needle protruding from the liquid reservoir tank, and the hollow needle includes:

a first opening communicating with an inside of the liquid reservoir tank;

a second opening for air-communication of an inside and an outside of the hollow needle into air communication; and a gas flow passage for air-communication of the first opening and the second opening.

2. The liquid supply system according to claim 1, wherein the first air communication portion is covered with a semipermeable membrane including an air-liquid separation member to shut down a flow of the liquid therethrough but allows a flow of gas therethrough.

3. The liquid supply system according to claim 1, wherein the second connection portion is located between a wall portion of the cartridge and a wall portion of the liquid reservoir tank in the state where the cartridge is mounted on the liquid reservoir tank, and is covered with a semipermeable membrane including an air-liquid separation member to shut down a flow of the liquid therethrough but allows a flow of gas therethrough.

4. The liquid supply system according to claim 1, wherein the cartridge includes a second air communication portion connected liquid-tightly with the second connection portion to connect an inside of the cartridge into air communication with an outside through the first air communication portion.

5. The liquid supply system according to claim 4, wherein the second air communication portion includes;

a through-hole penetrating a wall portion of the cartridge, and a gas flow passage for air-communication of a space in the cartridge into communication with the air through the through-hole.

6. The liquid supply system according to claim 5, wherein, in the gas flow passage, a semipermeable membrane to shut down a flow of the liquid therethrough, but allows a flow of gas therethrough is disposed.

7. The liquid supply system according to claim 4, wherein the cartridge further includes a sealing mechanism for sealing the second air communication portion, and, in a state where the second connection portion is connected to the second air communication portion, the sealing mechanism is in a state of being pressed inward by the second connection portion.

8. The liquid supply system according to claim 7, wherein, in the cartridge in an initial state, the second air communication portion is sealed by a sealing member from outside the cartridge, and, in a case of mounting the cartridge on the liquid supply system, the sealing member is penetrated by the second connection portion.

9. The liquid supply system according to claim 7, wherein the sealing mechanism includes:

a valve disposing to be capable of advancing and retreating relative to the second air communication portion; and an urging member urging the valve toward the second air communication portion, wherein, in a state where the cartridge is not mounted on the liquid reservoir tank, the second air communication portion is sealed by the valve.

10. The liquid supply system according to claim 9, wherein, in a case of connecting the second connection portion to the second air communication portion, the valve is moved by the second connection portion against an urging force of the urging member in a direction in which the valve separates from the second air communication portion.

11. The liquid supply system according to claim 1, further comprising a suction recovery mechanism for suctioning the liquid from an ejection port of the liquid ejection head.

12. A cartridge capable of being mounted on a liquid reservoir tank communicating with a liquid ejection head to eject a liquid, the cartridge comprising:

a liquid reservoir chamber which reserves the liquid to be supplied to the liquid reservoir tank;

a liquid supply portion configured to communicate fluidly with a first connection portion included in the liquid reservoir tank; and a second air communication portion configured to be liquid-tightly connected to a second connection portion included in the liquid reservoir tank and located above the first connection portion for connected air communication with a first air communication portion included in the liquid reservoir tank, wherein, at a time when the cartridge in an initial state is mounted on the liquid reservoir tank, a liquid surface of the liquid reserved in the liquid reservoir chamber is located above the second air communication portion, and the second connection portion includes a hollow needle protruding from the liquid reservoir tank, and the hollow needle includes a first opening communicating with an inside of the liquid reservoir tank, a second opening for air-communication of an inside and an outside of the hollow needle into air communication, and a gas flow passage for air-communication of the first opening and the second opening.

13. The cartridge according to claim 12, further comprising a gas flow passage to allow a space of the liquid reservoir chamber and the second air communication portion to communicate with each other.

14. The cartridge according to claim 13, wherein, in the gas flow passage, a semipermeable membrane to shut down a flow of the liquid therethrough but allows a flow of gas therethrough is disposed.

15. The cartridge according to claim 12, further comprising a sealing mechanism for sealing the second air communication portion, wherein, in a state where the cartridge is mounted on the liquid reservoir tank, the sealing mechanism is in a state of being pressed by the second connection portion.

16. The cartridge according to claim 15, wherein
the sealing mechanism includes:
a valve disposing to be capable of advancing and retreating relative to the second air communication portion; and
an urging member urging the valve toward the second air communication portion,
wherein, in a state where the cartridge is not mounted on the liquid reservoir tank, the second air communication portion is in a state of being sealed by the valve.

17. The cartridge according to claim 16, wherein,
in a case of mounting the cartridge on the liquid reservoir tank, the valve is moved by the second connection portion against an urging force of the urging member in a direction in which the valve separates from the second air communication portion.

18. The cartridge according to claim 12, further comprising:
a sealing member sealing the second air communication portion from outside in the cartridge in an initial state,
wherein, in a case of mounting the cartridge on the second air communication portion, the sealing member is penetrated by the second connection portion.

19. A liquid ejection apparatus comprising:
a liquid ejection head to eject a liquid;
a liquid reservoir tank communicating with the liquid ejection head; and
a cartridge configured to reserve the liquid to be supplied to the liquid reservoir tank and to be capable of being mounted on the liquid reservoir tank, wherein
the liquid reservoir tank includes:
a first air communication portion for air-communication of an inside and an outside of the liquid reservoir tank;
a first connection portion configured to connect the cartridge and the liquid reservoir tank into liquid communication in a state where the cartridge is mounted on the liquid reservoir tank, and
a second connection portion configured to be located above the first connection portion, liquid-tightly connected with the cartridge to connect the cartridge and the first air communication portion into air communication, in the state where the cartridge is mounted on the liquid reservoir tank,
wherein, at a time when the cartridge in an initial state is mounted on the liquid reservoir tank, the second connection portion is located below a liquid surface of the liquid reserved in the cartridge, and
the second connection portion includes a hollow needle protruding from the liquid reservoir tank, and
the hollow needle includes
a first opening communicating with an inside of the liquid reservoir tank,
a second opening for air-communication of an inside and an outside of the hollow needle into air communication, and
a gas flow passage for air-communication of the first opening and the second opening.

* * * * *